United States Patent
Kobusch et al.

(10) Patent No.: US 10,081,084 B2
(45) Date of Patent: Sep. 25, 2018

(54) METHOD FOR ALIGNING AT LEAST TWO CYLINDERS IN A PARALLEL MANNER RELATIVE TO EACH OTHER

(71) Applicant: Windmöller & Hölscher KG, Lengerich (DE)

(72) Inventors: Udo Kobusch, Bohmte (DE); Rainer Ehrenberg, Hasbergen (DE); Uwe Höwelmeyer, Ibbenbüren (DE); Frank Westhof, Recke (DE); Martin Krümpelmann, Lengerich (DE); Frank Gunschera, Osnabrück (DE)

(73) Assignee: Windmöller & Hölscher KG, Lengerich (DE)

( * ) Notice: Subject to any disclaimer, the term of this patent is extended or adjusted under 35 U.S.C. 154(b) by 891 days.

(21) Appl. No.: 14/398,488

(22) PCT Filed: Mar. 22, 2013

(86) PCT No.: PCT/EP2013/056132
§ 371 (c)(1),
(2) Date: Nov. 3, 2014

(87) PCT Pub. No.: WO2013/164132
PCT Pub. Date: Nov. 7, 2013

(65) Prior Publication Data
US 2015/0082600 A1    Mar. 26, 2015

(30) Foreign Application Priority Data

May 2, 2012   (DE) .................. 10 2012 103 853

(51) Int. Cl.
*B41F 13/30*   (2006.01)
*B41F 13/38*   (2006.01)
(Continued)

(52) U.S. Cl.
CPC ............ *B23P 19/10* (2013.01); *B23P 19/04* (2013.01); *B41F 13/30* (2013.01); *B41F 13/38* (2013.01);
(Continued)

(58) Field of Classification Search
CPC ........ B23P 19/10; B23P 19/04; B41F 31/307; B41F 31/32; B41F 30/00; B41F 13/30;
(Continued)

(56) References Cited

U.S. PATENT DOCUMENTS 8,578,850 B2 * 11/2013 Westhof .................. B41F 5/24
                                                              101/185
9,669,614 B2 *  6/2017 Ludin ..................... B41F 5/24
(Continued)

FOREIGN PATENT DOCUMENTS

| DE | 102009025053 | 12/2010 |
| EP | 1018426 | 7/2000 |
| EP | 2085223 | 8/2009 |
| EP | 2100732 | 9/2009 |

(Continued)

OTHER PUBLICATIONS

International Search Report dated Jul. 16, 2014 From the International Searching Authority Re. Application No. PCT/EP2013/056132 and Its Translation Into English.

(Continued)

*Primary Examiner* — Bayan Salone

(57) ABSTRACT

The invention relates to a method for aligning at least two cylinders in a parallel manner relative to each other. In a first step, one cylinder is rotated and moved in a parallel manner towards the other cylinder in order to align a first end of the cylinder, and in a second step, the second end of the cylinder is rotated and moved towards the other cylinder in order to align the second end of the cylinder.

12 Claims, 4 Drawing Sheets

(51) Int. Cl.
*B41F 13/24* (2006.01)
*B23P 19/04* (2006.01)
*B23P 19/10* (2006.01)
*B41F 30/00* (2006.01)
*B41F 31/32* (2006.01)
*B41F 31/30* (2006.01)

(52) U.S. Cl.
CPC ............ *B41F 30/00* (2013.01); *B41F 31/307* (2013.01); *B41F 31/32* (2013.01); *Y10T 29/49826* (2015.01); *Y10T 29/53* (2015.01)

(58) Field of Classification Search
CPC .... B41F 13/38; B41F 13/24; Y10T 29/49826; Y10T 29/53
USPC .................................................... 29/700, 428
See application file for complete search history.

(56) References Cited

U.S. PATENT DOCUMENTS 9,789,680 B2 * 10/2017 Frankenberg ............. B41F 5/24
2012/0079954 A1 * 4/2012 Westhof ................... B41F 5/24
                                                             101/248

FOREIGN PATENT DOCUMENTS

WO    WO 2010/142405    12/2010
WO    WO 2011/058074    5/2011

OTHER PUBLICATIONS

Pruefungsantrag [Request for Examination] Dated 18 Dec. 2012 From the Deutsches Patent- und Markenamt [German Patent and Trademark Office Re. Application No. 102012103853.8 and Its Translation Into English.

* cited by examiner

METHOD FOR ALIGNING AT LEAST TWO CYLINDERS IN A PARALLEL MANNER RELATIVE TO EACH OTHER

RELATED APPLICATIONS

This application is a National Phase of PCT Patent Application No. PCT/EP2013/056132 having International filing date of Mar. 22, 2013, which claims the benefit of priority of German Patent Application No. 10 2012 1030853.8 filed on May 2, 2012. The contents of the above applications are all incorporated by reference as if fully set forth herein in their entirely.

FIELD AND BACKGROUND OF THE INVENTION

The present invention refers to a method for a parallel alignment of at least two cylinders towards each other, as well as a calibrating device for the parallel adjustment of at least one cylinder relative to another cylinder.

Methods for the alignment of at least two cylinders are basically known. They are applied for example with printing machines, particularly rotational printing machines, in order to align the axes of the single cylinders relative towards another. The parallel adjustment should serve as a zero position of the cylinders towards one another, in order to subsequently enable a direct adjustment of the distances or the angles of single axes of the cylinders towards one another. In known methods a manual parallel teaching is applied for the parallel adjustment of the cylinders towards one another. This is manually applied and shifted between two cylinders, in order to perform a parallel adjustment of both cylinders towards one another in this manner. Likewise it is already known that complex calibrating devices are used, which are attached to one of both cylinders. These calibrating devices comprise sensors, which recognize, determine or measure the distance to the neighbouring cylinder.

It is a disadvantage of a known method or the known calibrating devices that with manual calibrating processes a high effort must be conducted. With methods which utilize highly automated or complex sensor implemented calibrating devices a great effort for the production of the calibrating device as well as for the assembly of the calibrating device is applied. Particularly the wire connection and the electrical power supply of the sensor technology of such a calibrating device is disturbing and problematic.

SUMMARY OF THE INVENTION

It is the object of the present invention to at least partially eliminate the described disadvantages. Particularly it is the object of the present invention to provide a method for the parallel alignment of at least two cylinders towards each other as well as the calibrating device for the parallel adjustment of at least one cylinder of a printing machine relative to another cylinder, which is more cost-efficient and realizes the corresponding parallel adjustment in a simple manner.

The previously described objection is solved by a method with the features of claim 1 as well as by a calibrating device with the features of claim 11. Further features and details of the invention result from the dependent claims, the description and the drawings. Thereby the features in detail which are described in connection with the method according to the invention apply, naturally also in connection with the calibrating device according to the invention and vice versa so that according to the disclosure of the single aspects of the invention it can always alternately be referred to.

A method according to the invention serves for the parallel alignment of at least two cylinders towards each other. Such a method according to the invention is characterized in that in a first step a rotation and a parallel displacement of the cylinder towards the other cylinder occurs for an alignment of the first edge of the cylinder. In a second step a rotation and a displacement of the second edge of the cylinder towards the other cylinder occurs for an adjustment of the second edge of the cylinder. In a method according to the invention at least two separated steps are intended.

In a first step a parallel displacement of one cylinder occurs while in a second step a singular displacement of one edge of the cylinder and thereby a tilting of the axes of the cylinder towards the axes of the neighbouring cylinder occurs. It is pointed out that in both steps a rotation of the cylinder occurs about its rotation axes.

This rotation can occur at the same time, during the displacement, or independent from the displacement, particularly stepwise. Therefore it is also possible that rotation of the to be displaced cylinder occurs about 360° and subsequently the corresponding parallel displacement or the displacement of the second edge is performed. In both cases a recognition of a contact of the respective cylinder with the other cylinder is enabled by combination of both steps by a displacement or a rotation. This leads to the fact that in a first step a contact with the other cylinder is performed by a parallel displacement of one of both edges. In this position the cylinder is either kept or is moved parallel backwards away from the other cylinder for another easier rotation.

Afterwards a second step is performed in which no parallel displacement but only a displacement of the opposing second edge of the cylinder occurs towards the other cylinder. In this case likewise an additional rotation of the cylinder about its rotational axes occurs at the same time or successively. Thereby it is ensured that successively or continuously after a certain path the second edge of the cylinder contacts the other cylinder. Likewise this contact is recognized and either the cylinder is kept in this position or is moved away from the other cylinder about a predefined path preferably about the same path.

In summary the method according to the invention can be performed in a way that by the parallel displacements of the cylinders in the first step the first edge is assembled while during the displacement in a second step the second edge is assembled. In the first step thus a parallel displacement occurs for the approach of the axes of both cylinders while in a second step the tilting of the axes of the cylinders toward the axes of the other cylinder occurs so that the desired parallelism is performed. Beneath the pure parallelism at the end of both steps a definition or a calibration concerning the distance of both cylinders occurs through a contact of both cylinders to one another. Concerning the parallelism and preferably also concerning the distance of both cylinders or both cylinder axes a new zero point can be set, from which the prospective displacements of both cylinders relative towards another can appear as a calibrating result.

In the method according to the invention no manual interference has to be performed. Manual parallelism statements are not necessary in this way. Moreover no complex calibrating devices with expensive and complex sensor mechanisms must be used. Rather a regress to both existing drives (actuating drive and rotation drive) occurs by a rotation and displacement of the cylinder towards one another and therefore automatically a method of adjustment according to the invention is performed. Additional wiring and/or additional sensor technology is not necessary for the performance of the method according to the invention. The method according to the invention is preferably for a cylinder of a printing machine, particularly a rotational printing machine or a flexographic printing press.

It can be of advantage when in the method according to the invention at least one cylinder is parallel adjusted relative to another cylinder in form of a counter-printing roller. This is particularly of advantage when in the method according to the invention a printing machine particularly a rotational printing machine or a flexographic printing press is used. The counter-printing roller can thereby be a roller, which applies the counter printing for a plurality of so called dye units, so that a plurality of single cylinders for example single making rolls or single thrust bearings are adjusted relatively parallel to the common counter-printing roller.

It is advantageously when in a method according to the invention a calibrating device is used, comprising a mainly hollow cylindrical calibrating body. At both edges of the hollow cylindrical calibrating body each an elevation is assembled, which are displaced in conveyance direction of the cylinder. Such a calibrating device is preferably assembled on one of both cylinders which should be aligned towards one another. Such a hollow cylindrical form can serve for sliding of such a calibrating device towards one of both cylinders. The elevations are assembled at the outer edges of the calibrating device, wherein the calibrating device comprises particularly an extension alongside the longitudinal axis of the hollow cylindrical form, which corresponds or mainly corresponds to the maximum printing width of the corresponding cylinder. With other words both elevations are preferably assembled at the outer edges of the printing area of the maximum printing width. The elevations extend radially towards the outside referring to the cylindrical calibrating body so that a greater diameter is intended by the elevation. Such a calibrating device is preferably made of a plastic material or from metal, so that the corresponding accuracy during the production of the dimensions of the elevation is ensured.

The method according to the invention can be developed in a way that the following steps are performed:
  Rotation of a cylinder and a parallel displacement of the cylinder towards the other cylinder, particularly a counter-printing roller,
  Recognizing the contact of one of both elevations with the other cylinder, particularly the counter-printing roller,
  Parallel displacement of the cylinder away from the other cylinder, particularly the counter-printing roller about a predefined path,
  Rotation of the cylinder and displacement of the edge of the cylinder towards the other cylinder particularly the counter-printing roller, which lies on the opposite of the elevation of the recognized contact,
  Recognizing the contact of the other of both elevations with the other cylinder, particularly the counter-printing roller,
  Displacement of the edge of the cylinder, which lies opposite of the elevation of the previously recognized contact, away from the other cylinder, particularly the counter-printing roller about a predefined path.

Naturally reverse displacements about a predefined path can occur also only optional in a parallel manner or in relation to the other edge of the cylinder. Naturally a method according to the invention is also possible without these two reverse movement steps. These two reverse movement steps ease the subsequent performance of the rotation of the cylinder, since in this manner an attachment of the elevation of the recognized contact at the already assembled edge is avoided.

With the method according to the invention preferably a calibrating device is fitted to one of both cylinders. This calibration device is preferably intended as it is previously described. By both elevations a recognition can be performed as follows. The elevations are displaced towards one another in conveyance direction of the calibrating device. Is this calibrating device surrounding one of the two cylinders, the cylinder can be rotated. Either at the same time or subsequently to a complete rotation of 360° afterwards this cylinder is moved towards another cylinder particularly the counter-printing roller, after a certain amount of parallel displacement steps or after covering a sufficient displacing path one of both elevations is bended to the other cylinder. Due to a displacement of both elevations of the calibrating device towards one another in conveyance direction it can be concluded from the current rotating position of the rotating cylinder which of both elevations is underlying this contact.

If both elevations are displaced towards another mainly about 180°, a rotation position of the cylinder would correlate within the first 180° of the rotation of the contact of the first elevation and within the second 180° of the rotation of the second elevation. Thereby not only basically a contact and thereby a predefined distance is determined but also the location of the contact regarding the edge of a cylinder. Subsequently the complete performance of the cylinder can optionally be reversely displaced parallel about a predefined path.

In a second step of the method according to the invention no more parallel displacement is performed but rather the recognized edge of the opposing edge of the cylinder is moved towards the other cylinder, particularly the counter-printing roller, particularly deviated. This pivoting movement or this pivoting of the edge leads to the fact that the engagement of the axis of the cylinder towards the axis of the other cylinder particularly towards the axis of the counter-printing roller is modified. Hereby a preferably parallel adjustment is desired. The steps occur like with the parallel displacement, which was subsequently explained, wherein either a rotation and a displacement at the same time or a gradually rotation and subsequent displacement is performed. In the same way as with the first edge an impact occurs, which follows preferably optionally subsequently a drive reverse displacement of this edge about a predefined path. As a result of both steps both edges of the cylinders are assembled exactly and predefined concerning the distance to the other cylinder particularly the counter-printing roller and moreover according to the assembly of both axes angular towards one another. It is an advantage when the reverse movement of both edges of the aligned cylinders occurs about the same amount so that the parallel adjustment of both axes of both cylinders towards one another exists at the end of a method according to the invention.

A gradual displacement in a manner according to the invention either in a parallel way or also regarding the second edge of the cylinder occurs preferably in particularly small steps. These steps are particularly smaller as approximately 1 mm and are arranged particularly in a range about approximately 100 μm.

It is pointed out that in the second step during the displacement of the second edge of the cylinder by pivoting the first edge regarding its distance to the other cylinder particularly the counter-printing roller is kept constantly. Both of the single cylinders are preferably cylinders for example format cylinders, rotation cylinders or a counter-printing roller, a printing machine or preferably a rotary printing press or a flexographic printing press.

Such a method is preferably performed automatically also without intervention from the outside. The calibrating device can also be assembled as a calibrating sleeve which is covered on a cylinder. Both edges of the to be aligned cylinders are performed in a printing device also as drive edge and operating edge or drive side and operating side so that on the drive side the rotation drive of the cylinder and on the operating side the access for the cylinder is assembled.

In the method according to the invention it can be of an advantage when for the parallel displacement and the displacement of one edge of the cylinder the same or many the same predefined path is covered. Thereby particularly a reverse movement is meant after the recognition of a contact of an elevation of a calibrating device at both edges. This leads to the fact that by the same or many the same predefined paths subsequently a predefined distance between the surface of the cylinder towards the counter-printing roller or towards the other cylinder occurs and at the same time due to the same reverse movement a parallelism or mainly parallelism of both cylinder axes towards one another is given.

Likewise it is advantageously if in a method according to the invention the parallel displacement of the cylinder and/or the displacement of one edge of the cylinder gradually towards the other cylinder particularly the counter-printing roller, occurs particularly subsequently to a complete rotation of the cylinder. The single steps are for example performed in a range of approximately 100 μm. The rotation is preferably stopped for a short time in order to subsequently perform a gradually readjustment in form of a parallel displacement or the deviation by the displacement of one edge of the cylinder. Naturally additionally or alternatively also a forward rotation during the displacement can occur so that a rotation and the displacement can be performed at the same time. Due to the concurrency of both actions the method according to the invention is speeded up. A method according to the invention in this manner can preferably be performed in form of a rough adjustment or a rough calibrating.

Another advantage is achieved by the fact that in a method according to the invention at each edge of the cylinder subsequently a parallel acute adjustment of at least one cylinder relative to the other cylinder, particularly the counter-printing roller is performed. The acute adjustment is particularly to be understood regarding the covered steps during the single displacements in a parallel manner or during the pivoting displacement of an edge of the cylinder. Thereby an acute adjustment preferably a reduction of the step width is used. Thereby an even higher accuracy regarding the parallelism but also regarding the defined distance between the surface of both cylinders assembled towards one another can be achieved.

The method according to the invention according to the subsequent paragraph is preferably developed in a way that for the acute adjustment of one edge of the cylinder the following steps are performed:

Gradual displacement of one edge of the cylinder toward the other edge of the cylinder particularly the counter-printing roller and rotation of the cylinder wherein with each step a diminished particularly mainly divided in half path is covered according to the subsequent step, Recognizing the contact of the displaced edge of a cylinder corresponding to the elevation of a calibrating device with the other cylinder, particularly the counter-printing roller, Displacement of one edge of the cylinder from the other cylinder, particularly the counter-printing roller away about one step, by which the diminished path according to the previous step, particularly a mainly divided in half path is covered.

The subsequent steps can be frequently repeated so that per step preferably a reduction, particularly a bisection of the step occurs. Such a division cascade can for example contain 100 μm, 50 μm, 25 μm, 12 μm, 6 μm and concludingly 3 μm. Thereby the cylinder continuously further approximates to the other cylinder particularly the counter-printing roller so that the distance and the parallelism of both cylinders towards one another is acutely adjusted.

A method according to the invention can be developed in a way that the align position of the cylinder is set as a zero position for the actuating device of the displacement of the cylinder. Beneath the rotation drive of the cylinder an actuating drive for example in form of a spindle drive can be intended. By the application of the cylinder during the production, particularly during a printing procedure it can appear that the zero position presenter of such actuating drives are displaced or the collective relation of the cylinder towards one another is displaced. By the method according to the invention a recalibration occurs which, particularly in an electronic manner newly sets the zero position for the actuating drive. Based on the newly calibrated zero position the adjustment of the distance of the cylinders towards one another and the engagement angles of the cylinders towards one another can be adjusted in a defined manner. Thereby actuating drives are intended preferably for both edges of the cylinders independently from one another, so that a first actuating drive operates for the first edge of the cylinder and a second actuating drive operates for the second edge of the cylinder.

It is another advantage when during a method according to the invention an external cylinder particularly a pattern cylinder of a printing machine is relatively adjusted parallel to the adjusted cylinder. Thereby the same steps are performed as they were subsequently described in detail. However instead of the cylinders and the edge of the cylinders respectively the external cylinders and the edges of the external cylinders respectively are displaced relative to the already adjusted cylinder. The format cylinder (the already adjusted cylinder) stays in the adjusted position towards another cylinder, particularly a counter-printing roller. This method can particularly be performed as a chain orientation so that subsequently a variable amount of further external cylinders are relatively adjusted in a manner according to the invention. Likewise for one or more of such external cylinders such a zero position for the actuating drive is provided.

Another embodiment of the present invention is a calibrating device for the parallel adjustment of at least one cylinder of a printing machine relative to another cylinder, particularly a counter-printing roller. Such a calibrating device comprises mainly hollow cylindrical calibrating bodies, at which both edges each a radial elevation is assembled. This both radial elevations are displaceable assembled towards another in conveyance direction of the cylinder, and the calibrating device is intended for an assembly on the cylinder. Such a calibrating device according to the invention is preferably applied in a method according to the invention. Thereby the calibrating device according to the invention provides the same advantages like they are described in detail regarding the method according to the invention.

It is an advantage when in the calibrating device according to the invention both elevations are assembled towards one another in conveyance direction of 180° or mainly 180° displaced to one another. Thereby the possibility of recognition by a complete rotation of 360° is split into two equal step widths concerning the rotation. This symmetrically performance leads to the fact that on one hand an exact recognition of the relative position of both cylinders towards one another and on the other hand a simple assembly of the calibrating device itself can be performed.

Likewise it is an advantage when by the calibrating device according to the invention the elevations comprise equal or mainly equal radial extensions, particularly in a range of approximately 0.5 mm to 5 mm. Preferably a range of approximately 2 mm +/− approximately 0.5 mm. The surface of each elevation amounts preferably approximately 30 mm×approximately 60 mm. These elevations extend radial toward the outside and are thereby raised above the remaining surface of the calibrating device particularly above the remaining surface of the calibrating body. Thereby they radially stick out according to this cylinder after the assembly of the calibrating device on the cylinder.

It is likewise advantageously if the surface of the elevation of the calibrating device according to the invention is curved or at least sectionally curved. This leads according to the recognition of the contact of this elevation with the opposing other cylinder to a line contact so that an acute and exact positioning or recognition of such a contact can be performed.

BRIEF DESCRIPTION OF THE DRAWINGS

The present invention is described in detail on the basis of the enclosed drawings. The used terms "left", "right", "up" and "down" are referring to the orientation of the drawings with normal readable references. It is schematically shown.

DESCRIPTION OF SPECIFIC EMBODIMENTS OF THE INVENTION

Figure 1:
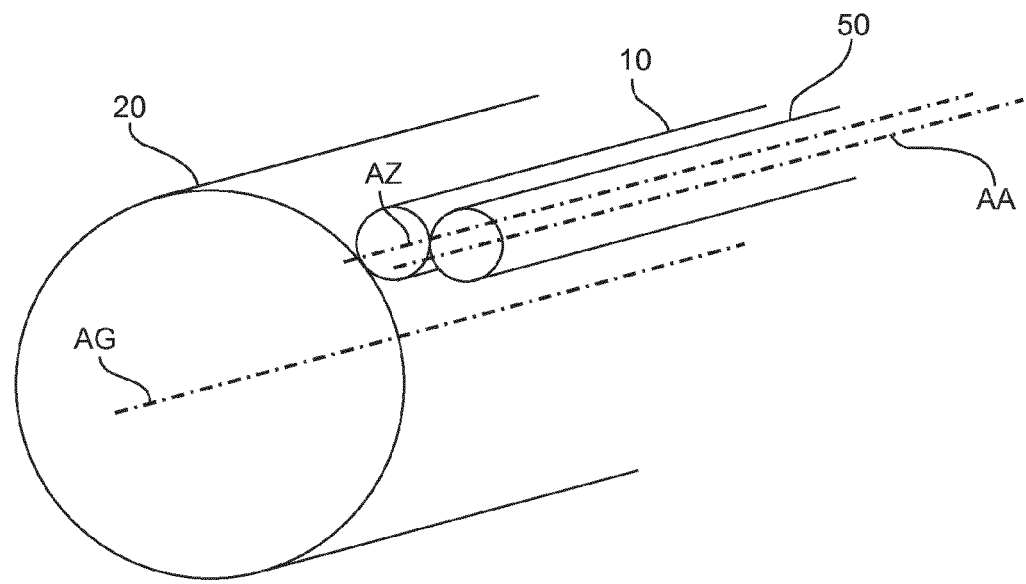
FIG. 1 a formation of different cylinders in relation towards to one another.

FIG. 1 shows a possibility how different cylinders 10, 20 and 50 can be assembled relative to one another. Thereby the cylinder 10 can be a making role of a printing machine, particularly a rotary printing press or a flexographic printing press. The adjustment occurs preferably towards a counter-printing roller 20, which can be utilized as a counter-printing roller for a plurality of (not shown) further cylinders. Moreover an external cylinder 50 can be attended in form of a thrust bearing, which thereby can be adjusted also relative to the cylinder 10 and thereby subsequently linked relative to the counter-printing roller 20.

By the adjustment in a parallel manner the adjustment of the single axis of rotations AG, AZ and AA towards one another is understood. These axes are displaced or deviated towards one another by the method according to the invention which is subsequently explained particularly in relation to FIGS. 3 to 8.

Figure 2:
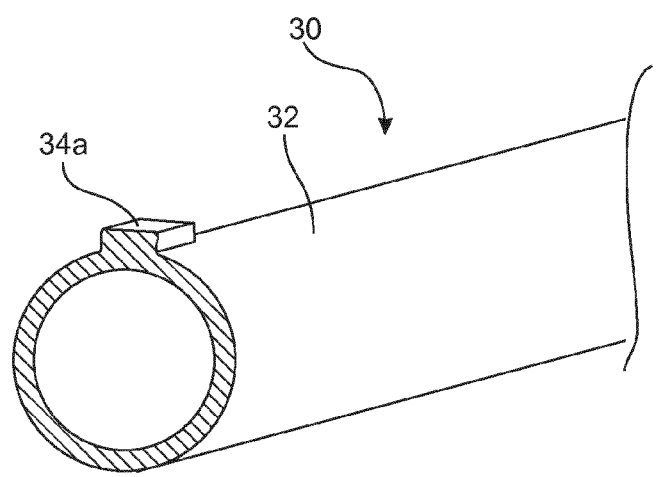
FIG. 2 an embodiment of a calibrating device.

In a method according to the invention preferably a calibrating device 30 is introduced, like exemplary shown in FIG. 2. It comprises a hollow cylindrical or a mainly hollow cylindrical calibrating body 32 which comprises a radial elevation 34a and 34b at both edges. For reasons of clarity in FIG. 2 only one first edge and thereby only one first radial elevation 34a is shown.

By means of FIGS. 3 to 8 the possibility of the performance of a method according to the invention is described. Thereby reference is made to an adjustment of the cylinder 10 relative to the counter-printing roller 20. Naturally the same steps can be performed in an identical manner also for an adjustment of the external cylinder 50 relative to the cylinder 10, wherein the corresponding displacement is performed in the same manner.

Figure 3:
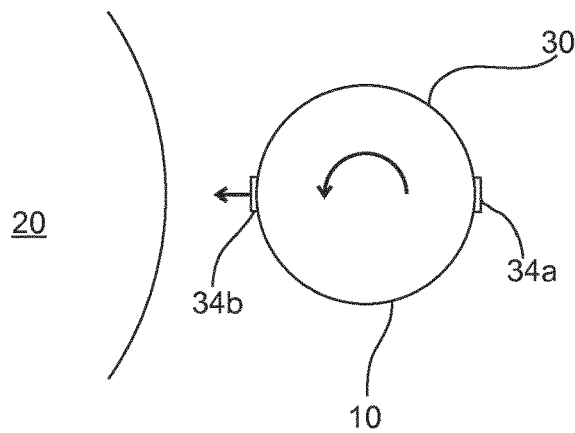
FIG. 3 the first step of an embodiment of the method according to the invention, FIG. 4 another step of an embodiment of the method according to the invention, FIG. 5 another step of an embodiment of the method according to the invention, FIG. 6 another step of the embodiment of the method according to the invention, FIG. 7 another step of an embodiment of a method according to the invention, FIG. 8 another step of the embodiment of a method according to the invention and, FIG. 9 a schematical description of a vernier adjustment with the method according to the invention.
Figure 3:
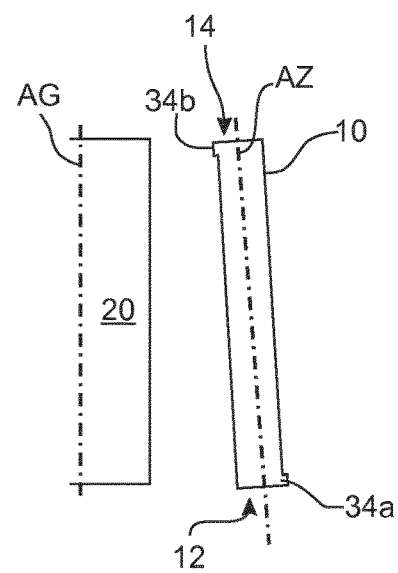

FIG. 3 shows an initial situation wherein the cylinder 10 is assembled with its cylinder axis AZ angled and in a distance to the counter-printing roller 20 or the rotation axis AG of the counter-printing roller 20. In this position a calibrating device 30, for example according to FIG. 3 is covering the cylinder 10, so that at both edges 12 and 14 of the cylinder 10 an elevation 34a and 34b is recognized which is each displaced in conveyance direction. FIGS. 3 to 8 each show two drawings, wherein on the left a line of vision alongside the respective axis of the cylinder 10 or the counter-printing roller 20 is shown while on the left side of each figure a top view can be recognized.

Figure 4:
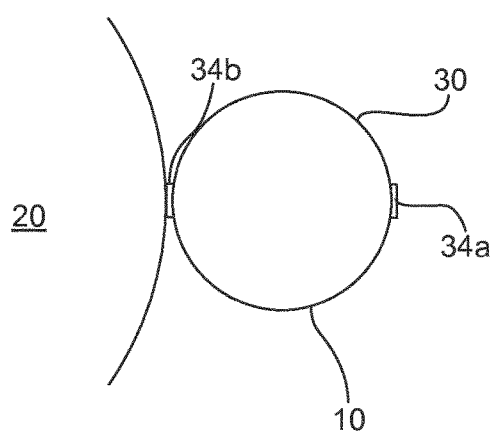
Figure 4:
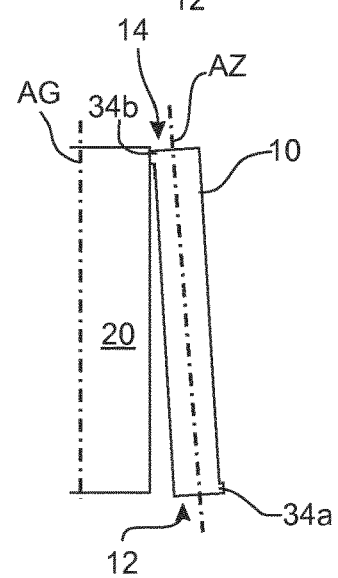

In FIG. 3 the start of the method according to the invention is shown wherein the cylinder 10 rotates about 360° and subsequently or at the same time moves towards the counter-printing roller 20. The step width of the movement towards in form of a parallel displacement is preferably performed in a range of approximately 100 µm. This gradual rotation and parallel displacement occurs until one of both elevations 34a and 34b bend at the counter-printing roller 20. This situation is shown in FIG. 4. Based on the fact that both elevations 34a and 34b are displaced in conveyance direction towards one another by the adjustment position in the direction of the rotation of the rotation drive of the cylinder 10 can be recognized which of both elevations 34a and 34b is just performing a contact with the counter-printing roller 20.

In FIG. 4 an elevation 34b is shown which is related to the operating edge 14 of the cylinder 10. Here, a defined position concerning the distance of the operating edge 14 relative to the counter-printing roller 20 exists. In order to subsequently adjust also the gear edge 12 in the same manner in a further step, the step is performed which is of advantage in the method according to the invention but basically optional. Thereby this is about a parallel displacement of the cylinder 10 away from the counter-printing roller 20 along a predefined path. This predefined path can for example be in the range of the approximately 100 µm.

Figure 5:
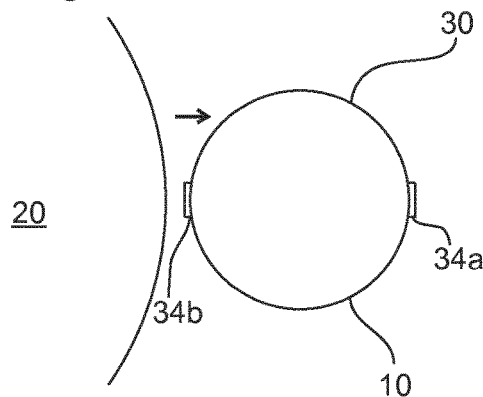
Figure 5:
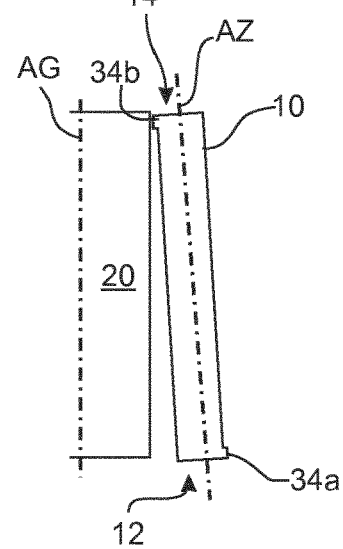
Figure 6:
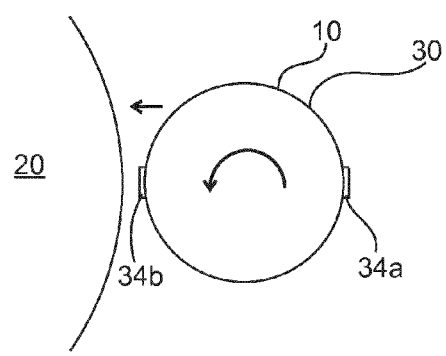
Figure 6:
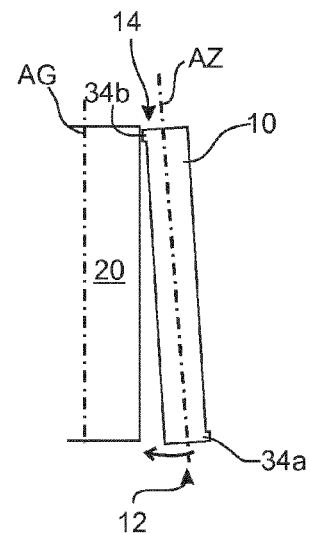
Figure 7:
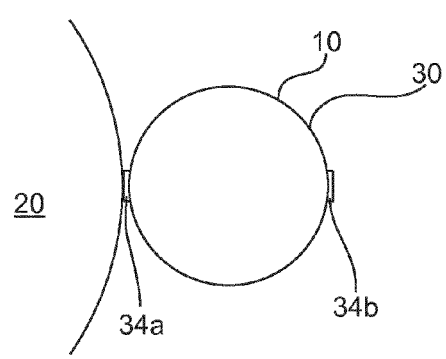
Figure 7:
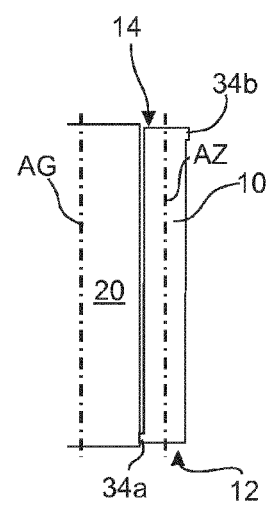
Figure 8:
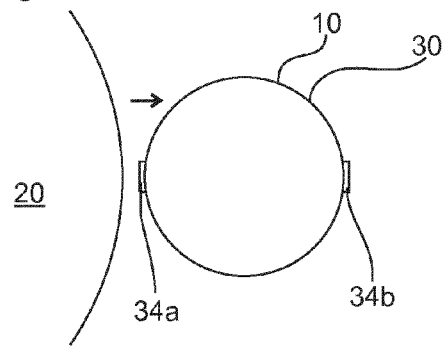
Figure 8:
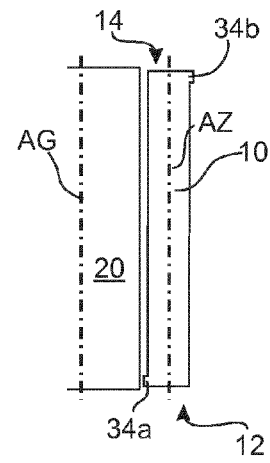

Thereby FIG. 5 shows that now the basic position for the next step of the method is shown like in FIG. 6. Here, likewise the cylinder 10 is again rotating, preferably gradually about always 360°. At the same time a displacement of the other edge, in this case the gear edge 12 occurs towards the counter-printing roller 20. Thereby by only displacing one edge 12 of the cylinder 10 the axis AZ of the cylinder 10 is deviated toward the axis AG of the counter-printing roller 20, like shown by the arrow at the gear edge 12. This end of the process is shown in FIG. 7, namely when the first elevation 34a contacts the counter-printing roller 20. In this position now a defined distance of the gear edge 12 of the cylinder 10 is given relative to the surface of the counter-printing roller 20.

Subsequently in an advantageously manner a movement away from the gear edge 12 of the cylinder 10 from the v 20 can occur as an optional step. The predefined path of this movement away is preferably identical like previously described, mainly approximately 100 μm. Either with or without movement away as a result now a parallel adjusted axis AZ relative to the axis AG of the counter-printing roller 20 exists. Thereby, that the dimensions in the elevation 34a and 34b are known in a radial direction and moreover the thickness of the calibrating body 32 is known, in that manner now a conclusion to the actual distance of the surface of the cylinder 10 and the counter-printing roller 20 as also the parallelism situation of both axes AZ and AG towards one another can be drawn. This position is set as a zero position so that by actuating drives (not shown) both edges of the cylinders 10 can now be adjusted based on this newly calibrated zero position.

Figure 9:
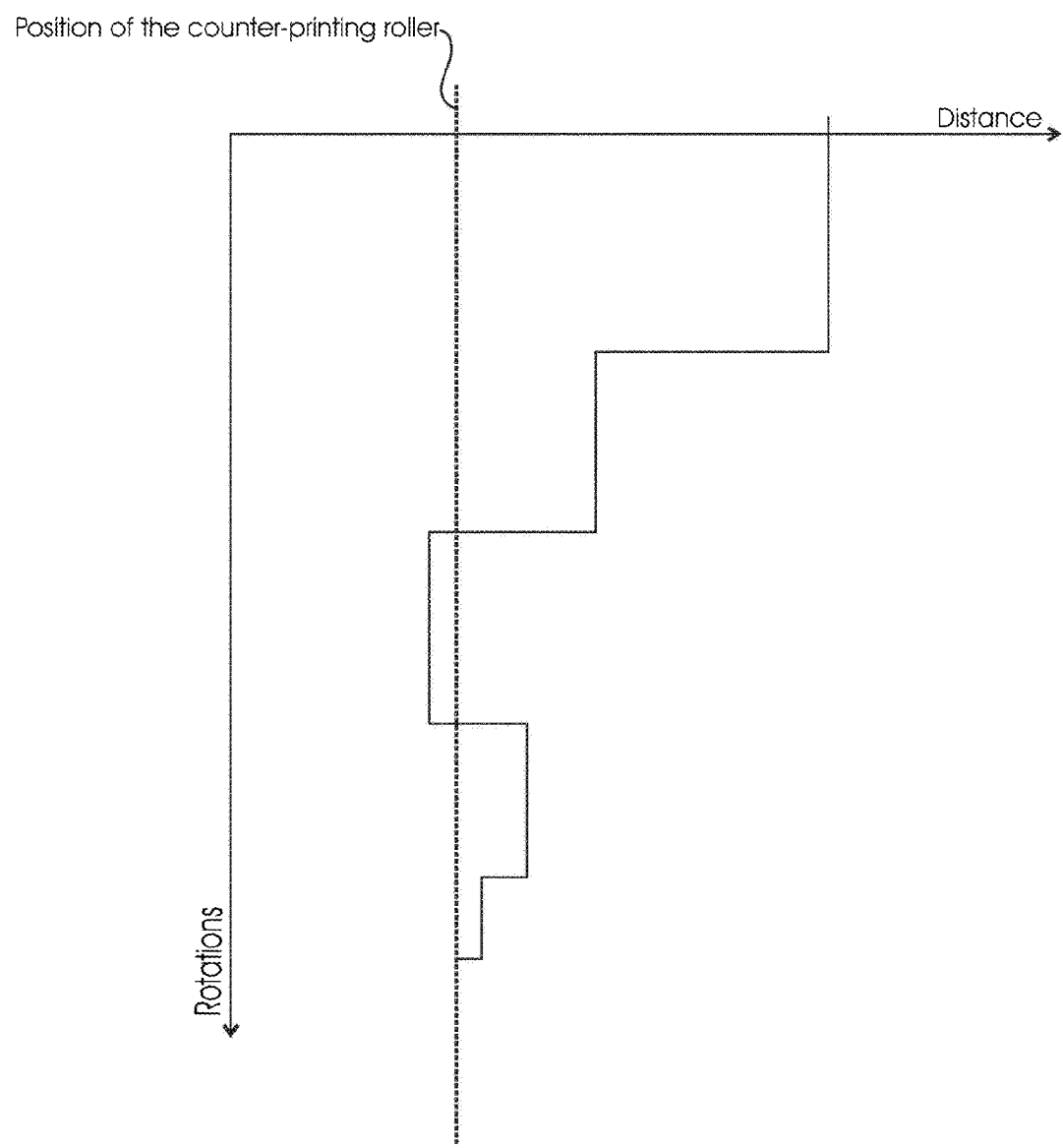

In FIG. 9 a performance of an acute adjustment is schematically shown. Thereby in the horizontal direction the distance of both cylinders or the cylinder 10 towards the counter-printing roller 20 is shown. On the vertical axis the amount of rotations is shown. Based on the position on the upper left with the distance of approximately 100 μm a rotation of the cylinder 10 is performed. Since no contact is recognized the cylinder 10 or its edge 12 or 14 is displaced towards the counter-printing roller 20 about 50 μm. Subsequently the next rotation of the cylinder 10 occurs, by which also no contact is recognized. Likewise subsequently a displacement of one edge 10 or 12 of the cylinder 10 and a parallel displacement of the cylinder 10 towards the counter-printing roller 20 occurs about a predefined path of 25 μm. During the subsequent rotation a contact of at least one of both elevations 34a and 34b is recognized. Since one is now too close to the counter-printing roller 20 subsequently yet another path divided in half namely about 12 μm a movement of the cylinder 10 or one of both edges 12 or 14 is moved away from the counter-printing roller 20. Subsequently a rotation occurs and again a movement towards the counter-printing roller 20 so that increasingly smaller step widths perform an acute adjustment of the assembly of one edge or the axis AZ of the cylinder 10.

The previous explanations of the embodiments describe the present invention only in way of examples. Naturally the single features of the embodiments as far as technically reasonable can be freely combined with one another, without leaving the scope of the present invention.

REFERENCE LIST

10 Cylinder
12 Gear edge
14 Operating edge
20 Counter-printing roller
30 Calibrating device
32 Calibrating body
34a Radial elevation
34b Radial elevation
50 External cylinder
AG Axis of rotation of counter-printing roller
AZ Axis of rotation cylinder
AA Axis of rotation of external cylinder

What is claimed is:

1. Method for the parallel alignment of at least two cylinders towards each other, comprising:
    carrying out a rotation and a parallel displacement of a first cylinder in the direction of a second cylinder to obtain an alignment of a first end of the first cylinder; and
    carrying out a rotation and an alignment of the second end of the first cylinder towards the second cylinder to obtain a first alignment of the second end of the first cylinder, wherein a calibrating device is utilized, the calibrating device comprising a hollow cylindrical calibrating body, the hollow cylindrical calibrating body having a first end and a second end, each of said ends having a respective elevation, wherein the first elevation is displaced with respect to the second elevation in a circumferential direction around the hollow cylindrical calibrating body.

2. Method according to claim 1, wherein at least one of said at least two cylinders is parallel adjusted relative to at least one other cylinder, the at least one other cylinder comprising a counter-printing roller.

3. Method according to claim 1, comprising:
    rotating said hollow cylindrical body and parallel displacing of the cylindrical hollow body towards at least one other cylinder,
    noting a contact of a firstof said elevations with the counter-printing roller,
    parallel displacing of the cylindrical hollow body away from the at least one other cylinder on a predefined path,
    rotating of the cylindrical hollow body and displacing of the first end of the cylinder away towards the at least one other cylinder, the at least one other cylinder being on the opposite of the elevations of the noted contact,
    noting a contact of a second of said elevations with the said at least one other cylinder
    displacing one of said ends of the cylindrical hollow body, which lies opposite of the elevations of the firstly recognized contact, away from the at least one other cylinder on a predefined path.

4. Method according to claim 1, wherein for the parallel displacement and the displacement of one end of a cylinder the same predefined path is covered.

5. Method according to claim 1, comprising parallel displacement of the cylindrical hollow body cylinder and/or the displacement of one end of the cylindrical hollow body towards the second cylinder, after each of a complete rotation of the first cylinder.

6. Method according to claim 1, comprising carrying out a further parallel alignment of each of said first and said second end towards the second cylinder, said further parallel alignment being of higher accuracy than said first alignment.

7. Method according to claim 6, further comprising carrying out an adjustment of a respective end of the first cylinder, the adjustment comprising:
    displacing one end of said first cylinder towards said second cylinder, and rotating the first cylinder, said displacing comprising successive steps, each step being half of a distance of a previous step;
    noting a contact of a respective elevation of the calibrating device which corresponds to an end of the first cylinder being adjusted, with the second cylinder;

adjusting said second end of said first cylinder away from the second cylinder, said adjustment comprising successive steps, each step being half of a distance of a previous step.

8. Method according to claim 1, setting an adjusted position of the first cylinder as a zero position for an actuating drive for the adjustment of the cylinder.

9. Method according to claim 1, wherein an external cylinder, is adjusted in parallel to the adjusted first cylinder, the external cylinder having a first end and a second end, wherein the external cylinder is adjusted along with each of said first and second ends of the external cylinder.

10. The method of claim 3, wherein the at least one other cylinder comprises a counter-printing roller.

11. The method of claim 7, wherein the second cylinder comprises a counter-printing roller.

12. The method of claim 9, wherein said external cylinder comprises a pattern cylinder of a printing machine.

\* \* \* \* \*